W. O. FREET.
OZONE GENERATOR.
APPLICATION FILED JAN. 23, 1912.
1,066,484.
Patented July 8, 1913.
2 SHEETS—SHEET 1.
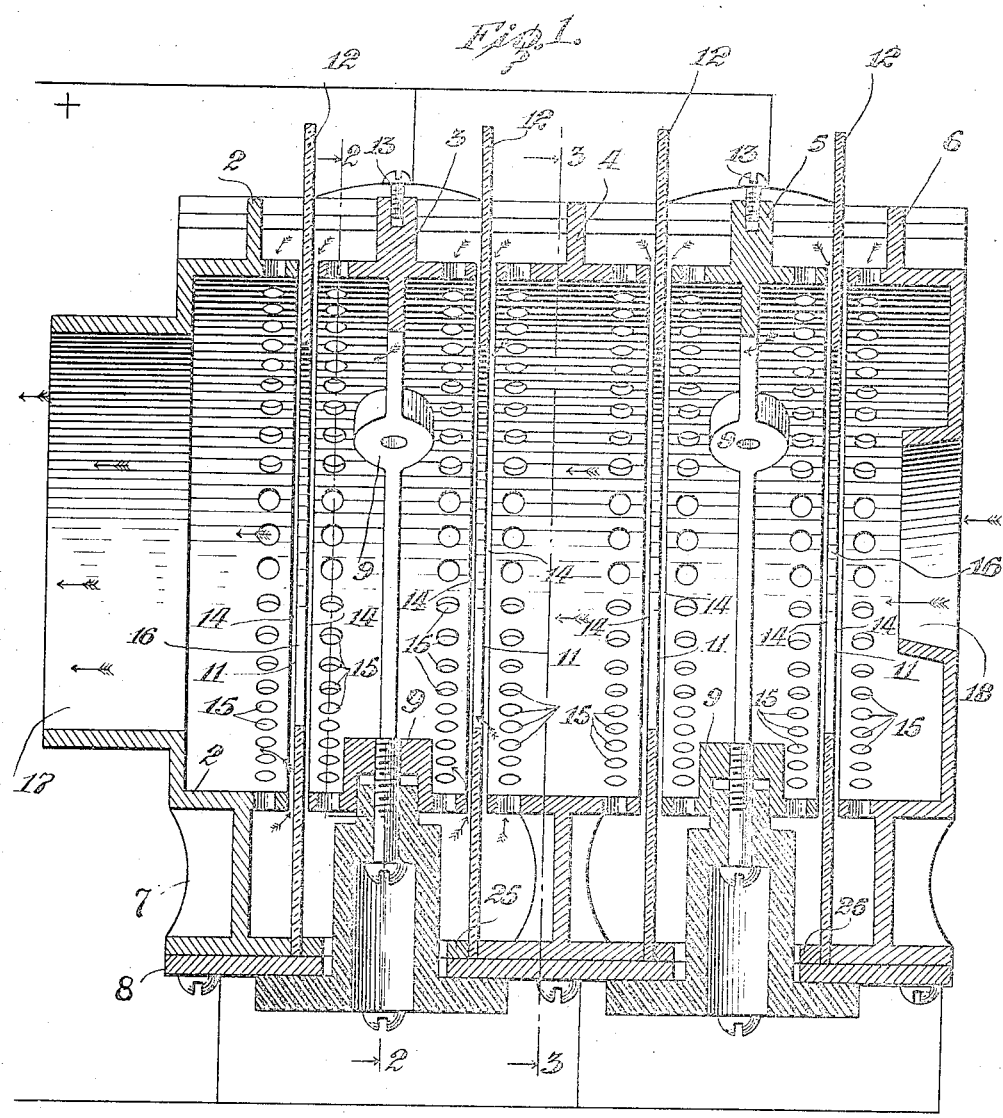

W. O. FREET.
OZONE GENERATOR.
APPLICATION FILED JAN. 23, 1912.
1,066,484.
Patented July 8, 1913.
2 SHEETS—SHEET 2.
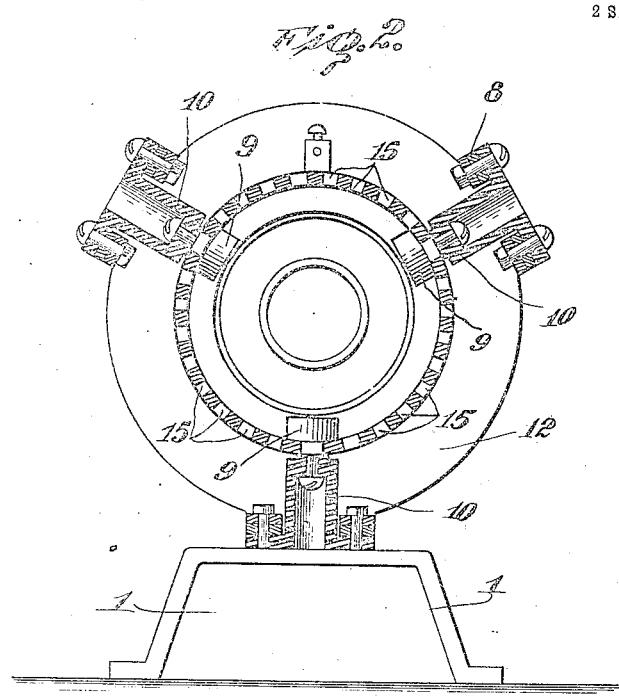
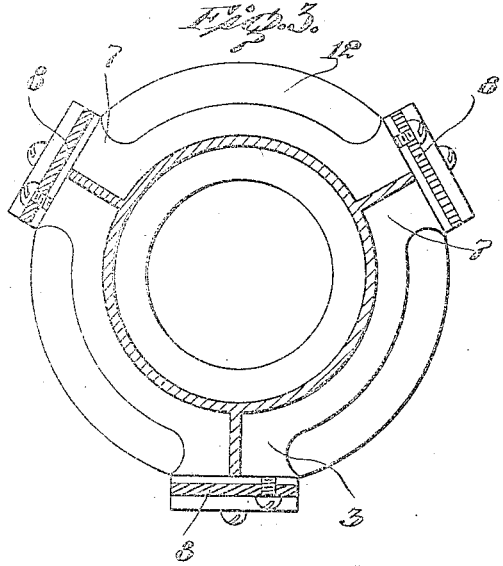
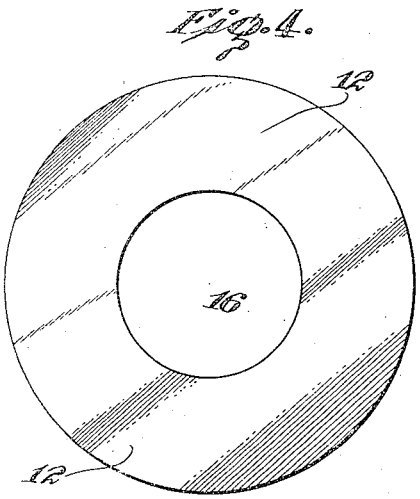

UNITED STATES PATENT OFFICE.

WILLIAM O. FREET, OF HACKENSACK, NEW JERSEY, ASSIGNOR TO STEYNIS OZONE COMPANY, A CORPORATION OF NEW YORK.

OZONE-GENERATOR.

1,066,484.

Specification of Letters Patent.   Patented July 8, 1913.

Application filed January 23, 1912.   Serial No. 672,870.

*To all whom it may concern:*

Be it known that I, WILLIAM O. FREET, a citizen of the United States, residing in Hackensack, county of Bergen, and State of New Jersey, have invented or discovered certain new or useful Improvements in Ozone-Generators, of which the following is a full, clear, and complete disclosure.

My invention relates to ozone generators of a kind suitable for use in producing ozone in small quantities and of relatively low concentration for purifying the air of apartments and for other uses where only low concentration and limited quantities are desired.

The object of my invention is to provide a compact, durable, reliable device for such use which can be cheaply manufactured and the parts of which can easily be assembled and removed for repairs should they become damaged.

In the drawing accompanying and forming a part of this specification, I have illustrated one embodiment of my invention.

In this drawing Figure 1 is a longitudinal vertical section of the generator. Fig. 2 is a transverse section taken on the line 2—2 of Fig. 1. Fig. 3 is a transverse section taken on the line 3—3 of Fig. 1. Fig. 4 is a detailed view showing one of the dielectric plates forming a part of the generator.

Referring in detail to the generator shown in these views, the numeral 1 designates a base of any suitable kind on which the generator is mounted. The generator comprises a plurality of ring-shaped electrodes 2, 3, 4, 5 and 6, spaced apart and in line with one another. The electrodes 2, 4 and 6 are provided with radial extensions 7 (see Fig. 3) which extensions are attached to the elongated strips 8, three in number, and the electrodes are held in fixed relation by these strips. The electrodes 3 and 5 are held in position by the insulators 10 which are attached at their inner ends to the lugs 9 on the electrodes and at their outer ends to the elongated strips 8. The electrodes are all spaced from one another so as to leave air gaps 11 between them and a ring-shaped dielectric plate 12 of glass or other suitable material is located in each of the air gaps. The electrodes 3 and 5 are connected by means of the binding post 13 with one side of a source of electric current of a suitable voltage for use with a machine of this kind and the electrodes 2, 4 and 6 are connected, as shown, to the other side of the same supply. The discharge takes place through the dielectric plates 12 between the oppositely disposed edges 14 of the ring-shaped electrodes in order that the ozone may be properly diluted or mixed with the air which it is intended to purify, each of the electrodes is provided with air openings 15 located adjacent the edges of the electrode and distributed around the circular wall of the electrode so that air may enter through these openings and mingle with the ozonized air. The dielectric plates each have open centers 16 and the electrode 2 is provided with a large opening 17 disposed opposite the small opening 18 in the electrode 6.

The operation of the generator is as follows: A suitable fan or blower is arranged to draw air through the opening 17. This causes air from the outside to enter the generator through the air gaps 14 so that it will pass through the electric discharges between the adjacent edges of the electrodes and be ozonized. Additional air enters through the openings 15 and the small opening 18 and mixes with the ozonized air and is purified. The mixture is thus made sufficiently dilute for use in living compartments where a high concentration would be objectionable. I have indicated the flow of air through the device by means of arrows.

While I have not shown the same, it is to be understood that the generator, because of the high voltage employed, is preferably incased in a suitable insulating or grounded case so as to prevent accidental contact therewith. The dielectric plates are the only parts of a machine of this kind which are liable to be damaged and, should this happen, these plates can easily be removed by removing one of the strips 8, which permits the damaged dielectric plates to be lifted out of the generator and new plates inserted.

Having now described my invention and mode of its use, what I claim is:

1. In a device of the kind described, a plurality of hollow electrodes having perforation in their walls and spaced from one another and separated by dielectric plates having openings at their centers.

2. In a device of the kind described, a plurality of hollow electrodes, spaced apart and in line with one another and held in fixed relation by strips extending along and secured to their outer walls, substantially as described.

3. In a device of the kind described, a plurality of ring-shaped electrodes spaced apart and in line with one another and held in fixed relation by strips extending along and secured to their outer walls, and dielectric ring-shaped plates interposed between said rings, substantially as described.

4. In a device of the kind described, a plurality of parallel strips, a plurality of ring-shaped electrodes attached directly to said strips, and a plurality of ring-shaped electrodes interposed between and alternating with said first named electrodes and secured to said strips indirectly by means of insulators, substantially as described.

5. In a device of the kind described, a plurality of ring-shaped electrodes spaced apart and in line with one another and held in fixed relation by strips extending along and secured to their outer walls, and dielectric ring-shaped plates interposed between said rings, said electrodes having air openings adjacent their edges, substantially as described.

WILLIAM O. FREET.

Witnesses:
JAMES J. COSGROVE,
R. M. RICKETTS.